United States Patent
Wente et al.

(10) Patent No.: US 10,891,242 B2
(45) Date of Patent: Jan. 12, 2021

(54) EMBEDDED USB2 (EUSB2) REPEATER OPERATION

(71) Applicant: Texas Instruments Incorporated, Dallas, TX (US)

(72) Inventors: Douglas Edward Wente, Murphy, TX (US); Suzanne Mary Vining, Plano, TX (US); Win Naing Maung, Plano, TX (US); Julie Marie Nirchi, Allen, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 16/661,018

(22) Filed: Oct. 23, 2019

(65) Prior Publication Data

US 2020/0264989 A1 Aug. 20, 2020

Related U.S. Application Data

(60) Provisional application No. 62/805,331, filed on Feb. 14, 2019.

(51) Int. Cl.
*G06F 13/42* (2006.01)
*G06F 13/10* (2006.01)

(52) U.S. Cl.
CPC ........ *G06F 13/102* (2013.01); *G06F 13/4282* (2013.01); *G06F 2213/0042* (2013.01)

(58) Field of Classification Search
CPC .. G06F 13/102; G06F 13/4282; G06F 1/3203; G06F 1/3215; G06F 1/3231; G06F 9/4418
See application file for complete search history.

(56) References Cited

U.S. PATENT DOCUMENTS

| | | | | |
|---|---|---|---|---|
| 2008/0288798 A1* | 11/2008 | Cooper | ................. | G06F 1/3228 713/322 |
| 2014/0003306 A1* | 1/2014 | Chen | .................. | G06F 13/4221 370/293 |
| 2014/0101345 A1* | 4/2014 | Ranta | .................. | G06F 11/3051 710/16 |
| 2014/0149609 A1* | 5/2014 | Chan | ..................... | G06F 13/385 710/16 |
| 2014/0173303 A1* | 6/2014 | Chen | .................. | G06F 13/4004 713/310 |

(Continued)

*Primary Examiner* — Raymond N Phan
(74) *Attorney, Agent, or Firm* — John R. Pessetto; Charles A. Brill; Frank D. Cimino

(57) ABSTRACT

A method of operating an embedded USB2 (eUSB2) repeater includes receiving a downstream packet at a USB2 port and transitioning a USB transmitter from an idle state to a standby state responsive to receiving the downstream packet. The method further includes transitioning the USB transmitter from the standby state to an active state if an upstream packet is received at an eUSB2 port within a first time period of receiving the downstream packet and transmitting the upstream packet. The method also includes transitioning the USB transmitter from the active state to the standby state after transmission of the upstream packet. The method also includes transitioning the USB transmitter from the standby state to the idle state if more upstream packets are not received at the eUSB2 port within a second time period.

32 Claims, 2 Drawing Sheets

(56) References Cited

U.S. PATENT DOCUMENTS

| | | | |
|---|---|---|---|
| 2015/0227489 A1* | 8/2015 | Chen | G06F 13/4291 |
| | | | 710/313 |
| 2016/0162427 A1* | 6/2016 | Kang | G06F 13/387 |
| | | | 710/313 |
| 2018/0004685 A1* | 1/2018 | Bhatt | G06F 13/4027 |
| 2018/0173666 A1* | 6/2018 | Srivastava | H04L 69/18 |
| 2019/0288743 A1* | 9/2019 | Wang | H04B 3/36 |
| 2020/0125527 A1* | 4/2020 | Maung | G06F 13/382 |

* cited by examiner

EMBEDDED USB2 (EUSB2) REPEATER OPERATION

BACKGROUND

The disclosure generally relates to embedded USB2 (eUSB2) repeater operation.

DESCRIPTION OF THE RELATED ART

Universal Serial Bus (USB) is an industry standard that establishes protocols for connection, communication and power supply for computers, peripheral devices and communication devices. The expansion of USB has resulted in the development of wide range of USB devices with varying power requirements. As power efficiency becomes critical in computers, peripheral devices and communication devices, embedded USB2 (eUSB2) devices are used as a low voltage solution to traditional USB2.0 devices. An eUSB2's small form factor, lower power consumption, and fast access times, offer advantages over a USB2.0. Although, an eUSB2 and a USB2.0 are not electrically compatible, various mechanisms have been defined for eUSB2 to support standard USB2.0. For example, an eUSB2 repeater can be used to convert an eUSB2 signal to a USB2.0 signal and vice versa.

According to a protocol, an eUSB2 repeater is required to start transmitting packets on its USB2 port within 4 high speed (HS) interval units (UIs) (i.e., 8 ns) of receiving a packet on its eUSB2 port. Also, the protocol requires that a peripheral device will only transmit to a host after receiving a packet from the host, and the peripheral device is required to transmit within 192 UIs of receiving a packet from the host. In order to comply with the protocol, transmitters in eUSB2 repeaters generally operate in two states: an active state, and a standby state. In the active state, a transmitter transmits packets through a USB2 port at full power by driving current to a load. In the standby state, although the transmitter remains idle, current is shunted to ground to maintain internal nodes and bias loops at normal levels to allow a quick transition to the active state. When the transmitter transitions from the standby state to the active state, current is simply switched back to the load. As a result, the power consumption by the transmitter in the standby state is same as the power consumption in the active state.

SUMMARY

Various aspects of the present disclosure are directed to a method of operating an embedded USB2 (eUSB2) peripheral repeater. In one aspect, a method includes receiving a downstream packet at a USB2 port of the eUSB2 peripheral repeater and transitioning a USB transmitter of the eUSB2 peripheral repeater from an idle state to a standby state responsive to receiving the downstream packet at the USB2 port. The method further includes transitioning the USB transmitter of the eUSB2 peripheral repeater from the standby state to an active state if an upstream packet is received at an eUSB2 port of the eUSB2 peripheral repeater within a first time period of receiving the downstream packet at the USB2 port and transmitting the upstream packet by the USB transmitter of the eUSB2 peripheral repeater during the active state. The method also includes transitioning the USB transmitter of the eUSB2 peripheral repeater from the active state to the standby state after transmission of the upstream packet. The method also includes transitioning the USB transmitter of the eUSB2 peripheral repeater from the standby state to the idle state if more upstream packets are not received at the eUSB2 port of the eUSB2 peripheral repeater within a second time period. The method also includes transitioning the USB transmitter of the eUSB2 peripheral repeater from the idle state to the standby state within a third time period of receiving the downstream packet at the USB2 port.

In an additional aspect of the disclosure, the first time period is 192 high speed (HS) unit intervals (UIs), the second time period is 280 UIs, and the third time period is 128 ns.

In an additional aspect of the disclosure, a method of operating an embedded USB2 (eUSB2) peripheral repeater includes receiving a downstream packet at a USB2 port of the eUSB2 peripheral repeater and transitioning a USB transmitter of the eUSB2 peripheral repeater from an idle state to a standby state responsive to receiving the downstream packet at the USB2 port. The method further includes transitioning the USB transmitter of the eUSB2 repeater from the standby state to the idle state if an upstream packet is not received at an eUSB2 port of the eUSB2 repeater within a second time period responsive to receiving the downstream packet at the USB2 port. The method also includes transitioning the USB transmitter of the eUSB2 peripheral repeater from the idle state to the standby state within a third time period of receiving the downstream packet at the USB2 port.

DETAILED DESCRIPTION

Reference will now be made in detail to the embodiments, examples of which are illustrated in the accompanying drawings, in which some, but not all embodiments are shown. Indeed, the concepts may be embodied in many different forms and should not be construed as limiting herein. Rather, these descriptions are provided so that this disclosure will satisfy applicable requirements.

Figure 1:
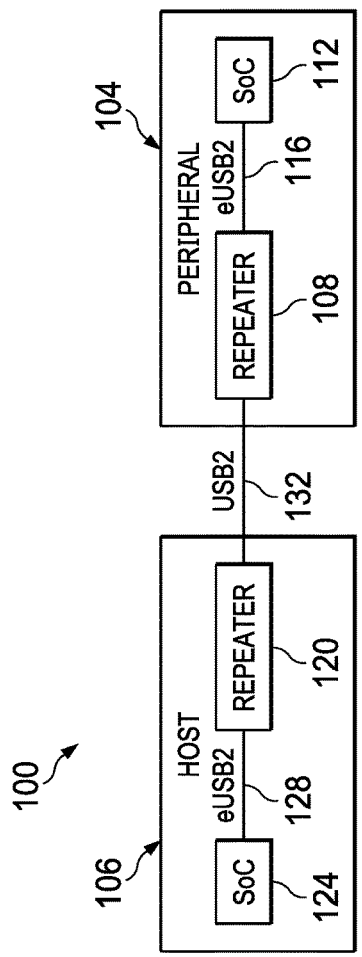
FIG. 1 is a block diagram illustrating a peripheral device connected to a host.

FIG. 1 is a block diagram 100 illustrating a peripheral device 104 connected to a host 106 in accordance with an exemplary embodiment. The peripheral device 104 includes an eUSB2 peripheral repeater 108 connected to a peripheral system-on-chip (SoC) 112 via an eUSB2 bus 116. The peripheral SoC 112 can be a processor, a controller or the like.

With reference to FIG. 1, the host 106 includes a host repeater 120 interconnected with a host SoC 124 via an eUSB2 bus 128. The host 106 is connected to the peripheral device 104 via a USB2 bus 132. Thus, the USB2 bus is used an external connection between the host 108 and the peripheral device, and the eUSB2 bus 116 is used for inter-chip interconnect (e.g., interconnect the eUSB2 peripheral repeater 108 and the peripheral SoC 112). In other embodiments, the host 106 may not include a repeater. The host 106 may include the host SoC 124 which directly drives the USB2 bus 132.

In operation, the host 106 transmits a downstream packet to the peripheral device 104 over the USB2 bus 132. The peripheral repeater 108 converts the received downstream packet, which is in a USB2 signal form, to a downstream signal in an eUSB2 signal form and sends the downstream packet to the peripheral SoC 112 over the eUSB2 bus 116. The peripheral SoC 112 may respond to the host with an upstream packet which is transmitted to the peripheral repeater 108 over the eUSB2 bus 116. The peripheral repeater 108 converts the upstream packet, which is in an eUSB2 signal form, to an upstream packet in a USB2.0 signal form and transmits the upstream packet to the host 106 over the USB2 bus 132. Thus, the peripheral repeater 108 converts a USB2.0 signal to an enUSB2 signal and vice versa.

Variations are possible within the scope of the disclosure. In an exemplary embodiment, one or more USB2.0 hubs may be inserted between the host 106 and the peripheral repeater 108. The USB2.0 hubs may exchange packets with the peripheral repeater 108.

Figure 2:
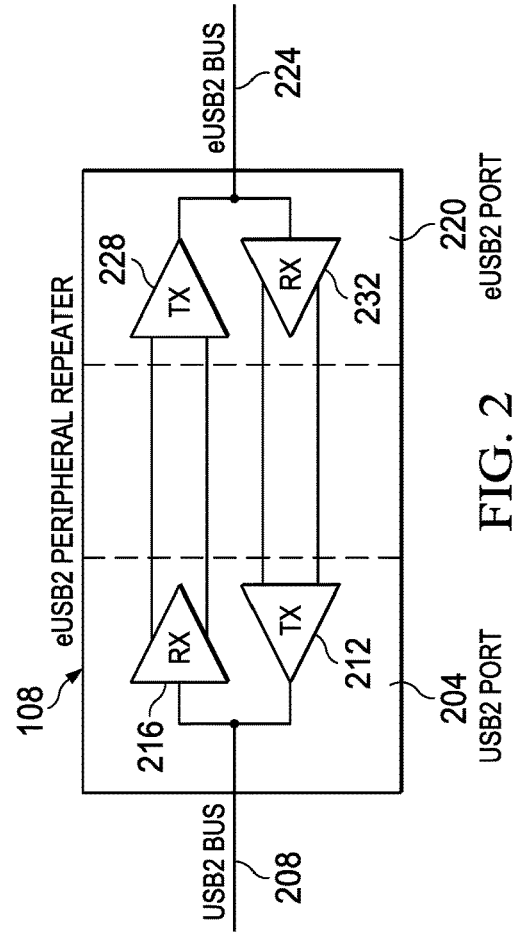
FIG. 2 is a block diagram of an eUSB2 peripheral repeater.

FIG. 2 is a more detailed block diagram of the eUSB2 peripheral repeater 108 in accordance with an exemplary embodiment. The eUSB2 peripheral repeater 108 includes a USB2 port 204 configured to interface with a USB2 bus 208. The USB2 bus 208 provides connection to an external device such as the host 106 (shown in FIG. 1). The USB2 port 204 includes a USB2 transmitter 212 and a USB receiver 216. The eUSB2 peripheral repeater 108 receives a downstream packet from a host over the USB2 bus 208 through the USB receiver 216 and transmits an upstream packet to the host over the USB2 bus 208 through the USB transmitter 212.

With continuing reference to FIG. 2, the eUSB2 peripheral repeater 108 also includes an eUSB2 port 220 configured to interface with an eUSB2 bus 224. The eUSB2 bus 224 provides an inter-chip interconnect with the peripheral SoC 112 (shown in FIG. 1). The eUSB2 port 224 includes an eUSB2 transmitter 228 and an eUSB2 receiver 232. The eUSB2 peripheral repeater 108 receives an upstream packet from the peripheral SoC 112 or another device over the eUSB2 bus 224 through the eUSB2 receiver 232 and a transmits downstream packet to the peripheral SoC 112 (shown in FIG. 1) or another device over the eUSB2 bus 224 through the eUSB2 transmitter 228.

In accordance with an exemplary embodiment, the eUSB2 peripheral repeater 108 is operated such that the USB transmitter 212 is switched among three states: an active state; a standby state; and an idle state. By switching the USB transmitter 212 among the three states, further efficiency in power consumption is realized.

In an aspect of the disclosure, when a downstream packet is received at the USB2 port 204 of the eUSB2 peripheral repeater 108, the USB transmitter 212 transitions from an idle state to a standby state. A squelch circuit (not shown in FIG. 2) can be used to detect the downstream packet at the USB2 port 204. The idle state is defined as a reduced power or low power state, whereas in the standby state current is shunted to ground. When the host 108 (shown in FIG. 1) transmits a downstream packet over the USB2 bus 208, the downstream packet is received at the USB2 port 204 of the eUSB2 peripheral repeater 108. In response, the USB transmitter 212 transitions from an idle state to a standby state within a first predetermined time period. The USB 2.0 protocol requires the peripheral SoC 112 to either respond to the host within 192 UI of receiving the downstream packet or to not respond. For example, the downstream packet may require the peripheral SoC 112 to respond with data or with an ACK, or the downstream packet may not require the peripheral SoC 112 to respond. According to the protocol, if the peripheral SoC 112 is required to respond to the host, the peripheral SoC 112 must generate an upstream packet which must arrive at the eUSB2 port 220 within 192 UI of receiving the downstream packet at the USB2 port 212. In order to address the possibility that an upstream packet may arrive at the eUSB2 port 220 and be ready to start transmitting in a timely manner, the USB transmitter 212 is speculatively transitioned from the idle state to the standby state, which allows the USB transmitter 212 to transition to an active state to start transmitting if necessary.

With continuing reference to FIG. 2, if the upstream packet is received at the eUSB2 port 220, the USB transmitter 212 transitions from the standby state to the active state and transmits the upstream packet over the USB2 bus 208. A squelch circuit (not shown in FIG. 2) may be used to detect the upstream packet at the eUSB2 port 220. In the active state, current is driven to a load by the USB transmitter 212. After the upstream packet is transmitted, the USB transmitter 212 transitions from the active state to the standby state. The USB transmitter 212 remains in the standby state to be prepared for an additional upstream packet that may arrive at the eUSB2 port 220. If an additional upstream packet does not arrive at the eUSB2 port 220 within a second predetermined time period of transition to the standby state, the USB transmitter 212 transitions from the standby state to the idle state.

Thus, by speculatively and pre-emptively transitioning the USB transmitter 212 from the idle state to the standby state upon receiving a downstream packet at the USB2 port 212, the USB transmitter 212 is held in a state which enables it to switch to the active state and begin transmission of an upstream packet if the peripheral SoC 112 responds to the host. Also, the USB transmitter 212 continues to remain in the active state after transmission of the upstream packet for a second predetermined time period to to address the possibility that more upstream packets may arrive at the eUSB2 port. However, if no additional upstream packets arrive at the eUSB2 port 220 within a second predetermined time period, the USB transmitter 212 transitions to the idle state.

As discussed before, after the downstream packet is received at the USB2 port 204, the peripheral SoC 112 may determine that a response is not required. In that scenario, the peripheral SoC 112 will not generate an upstream packet and thus no upstream packet will arrive at the eUSB2 port 220 responsive to the downstream packet. The USB transmitter 212 will transition from the standby state to the idle state if an upstream packet is not received at an eUSB2 port within a third time period after receiving the downstream packet at the USB port 204. A timer inside the USB transmitter 212 may be used to control the transition of the USB transmitter 212.

In accordance with an exemplary embodiment, the first time period is 192 high speed (HS) unit intervals (UIs), the second time period is 280 high speed (HS) unit intervals (UIs), and the third time period is 128 ns.

Figure 3:
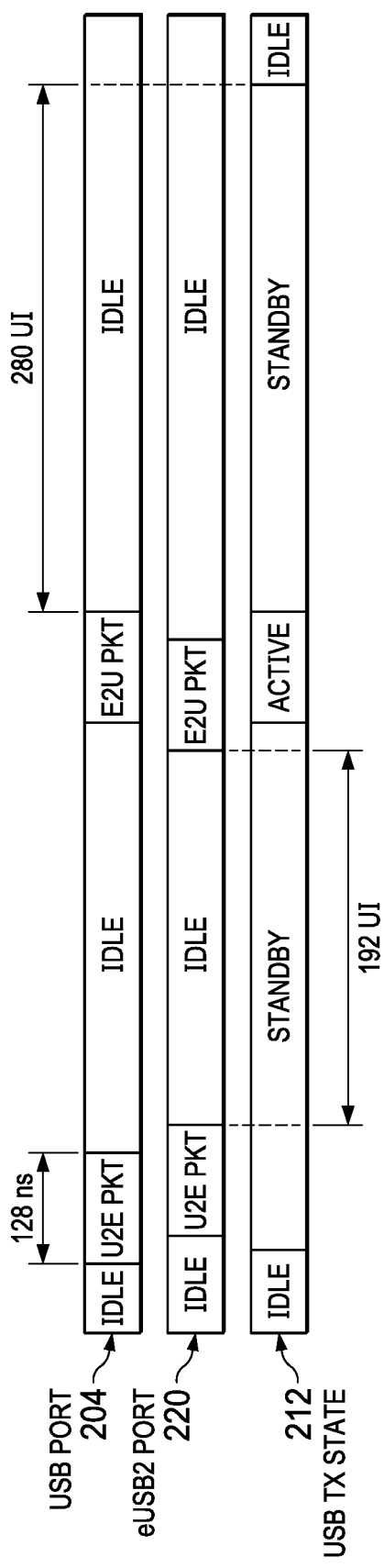
FIGS. 3-4 show timing diagrams of packets.

FIG. 3 illustrates a timing diagram of packets at the eUSB2 peripheral repeater 108 in accordance with an exemplary embodiment. In this example, a downstream packet (U2E packet) is transmitted by a host over the USB2 bus to the peripheral device. The peripheral device responds by transmitting an upstream packet (E2U packet) to the host over the USB2 bus.

With continuing reference to FIG. 3, prior to receiving a packet, the USB2 port 212, the eUSB2 port 220 and the USB transmitter 212 are in idle states. The idle state is defined as a reduced power or low power state. Next, a downstream packet (U2E packet) having 64 bits is received at the USB2 port 212. In response, the USB transmitter 212 transitions from the idle state to a standby state. Next, an upstream packet (E2U packet) is received at the eUSB2 port 220 within 192 UIs of receiving the downstream packet (U2E packet). In response, the USB transmitter 212 transitions from the standby state to an active state and transmits the upstream packet (E2E packet) through the USB2 port 212. After transmission of the upstream packet (E2E packet), the USB transmitter 212 transitions from the active state to the standby state and continues to remain in the standby state. If another upstream packet (E2U packet) is not received at the eUSB2 port 220 within 280 UIs of transmitting the upstream packet (E2U packet), the USB transmitter 212 transitions from the standby state to the idle state. The USB transmitter 212 remains in the idle state until the next downstream packet (U2E packet) is received at the USB2 port 204.

Figure 4:
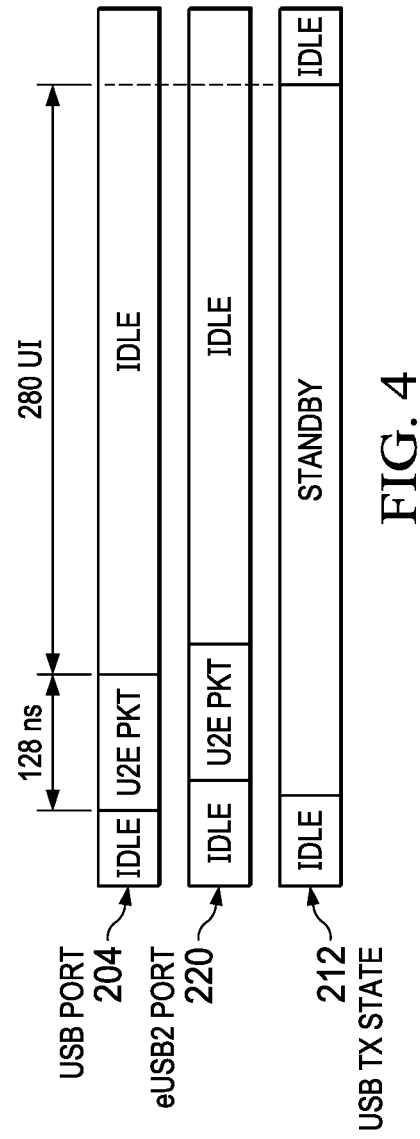

FIG. 4 illustrates a timing diagram of packets at the eUSB2 peripheral repeater 108 in accordance with another exemplary embodiment. In this example, a downstream packet (U2E packet) is transmitted by a host over the USB2 bus to the peripheral device. The peripheral device does not respond by transmitting an upstream packet (E2U packet) to the host.

With continuing reference to FIG. 4, prior to receiving a packet, the USB2 port 212, the eUSB2 port 220 and the USB transmitter 212 are in idle states. Next, a downstream packet (U2E packet) having 64 bits is received at the USB2 port 212. In response, the USB transmitter 212 transitions from the idle state to a standby state. The USB transmitter 212 remains in the standby state and waits for an upstream packet (E2E packet) to arrive at the eUSB2 port 220. However, because the peripheral device does not respond to the host, no upstream packet (E2U packet) arrives at the eUSB2 port 220 for at least 280 UIs. Since no upstream packet (E2U packet) is received at the eUSB2 port 220 within 280 UIs of being in the standby state, the USB transmitter 212 transitions from the standby state to the idle state. The USB transmitter 212 remains in the idle state until the next downstream packet (U2E packet) is received at the USB2 port 204.

Figure 5:
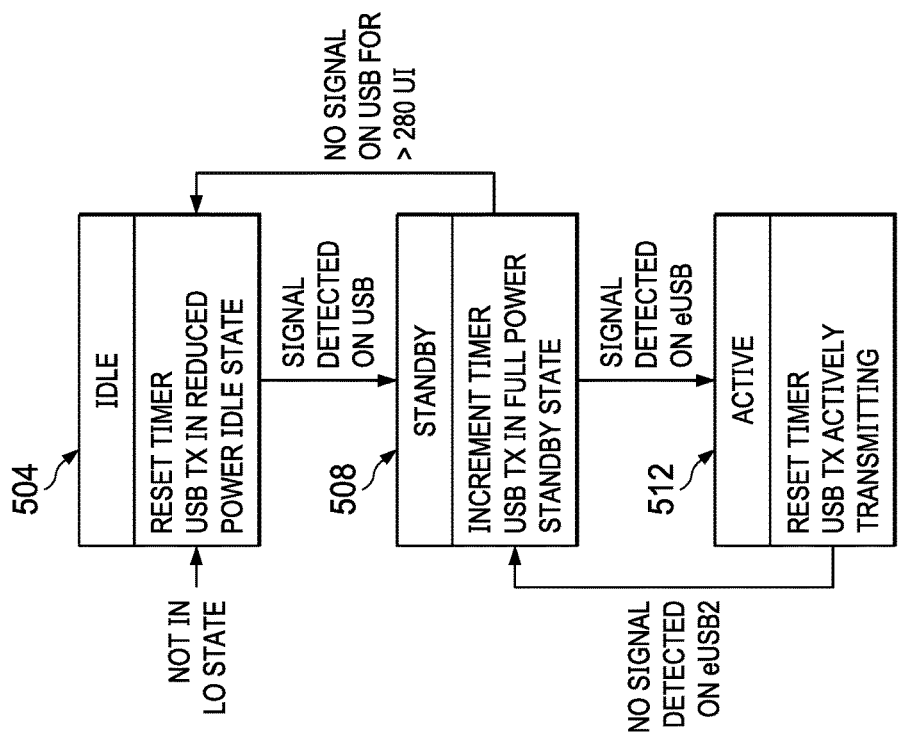
FIG. 5 is a state diagram illustrating states and transitions of a USB transmitter.

FIG. 5 is a state diagram 500 illustrating states and transitions of the USB transmitter 212 in accordance with an exemplary embodiment. A finite state machine may be used to control the USB transmitter 212.

With continuing reference to FIG. 5, the USB transmitter 212 initially remains in an idle state 504. In the idle state 504, the USB transmitter 212 is in a reduced or low power state and a timer is reset. Next, a signal is detected on the USB2 bus 208 (i.e., a downstream packet is received at the USB2 port 204). In response, the USB transmitter 212 transitions from the idle state 504 to a standby state 508. In the standby state 508, the USB transmitter 212 is in a full-power standby and the timer is incremented. Next, a signal is detected on the eUSB2 bus (i.e., an upstream packet is received at the eUSB2 port 220). In response, the USB transmitter 212 transitions from the standby state 508 to an active state 512 and the timer is reset. In the active state 512, the USB transmitter 212 transmits the upstream packet over the USB2 bus 208. The USB transmitter 212 continues to remain in the active state 512 but returns to the standby state 508 if another upstream packet is not received prior to the expiration of the timer. Referring again to the standby state 508, if no signal is detected on the USB2 bus (i.e., a downstream packet is not received at the USB2 port 204) before the expiration of the timer, the USB transmitter 212 transitions back to the idle state 504. The USB transmitter 212 continues to remain in the idle state 504 until the next downstream packet is received at the USB2 port 212.

Various illustrative components, blocks, modules, circuits, and steps have been described above in general terms of their functionality. Whether such functionality is implemented as hardware or software depends upon the particular application and design constraints imposed on the overall system. The described functionality may be implemented in varying ways for each particular application, but such implementation decision should not be interpreted as causing a departure from the scope of the present disclosure.

For simplicity and clarity, the full structure and operation of all systems suitable for use with the present disclosure is not being depicted or described herein. Instead, only so much of a system as is unique to the present disclosure or necessary for an understanding of the present disclosure is depicted and described.

What is claimed is:

1. A method of operating an embedded USB2 (eUSB2) peripheral repeater, comprising:
   receiving a downstream packet at a USB2 port of the eUSB2 peripheral repeater;
   transitioning a USB transmitter of the eUSB2 peripheral repeater from an idle state to a standby state responsive to receiving the downstream packet at the USB2 port;
   transitioning the USB transmitter of the eUSB2 peripheral repeater from the standby state to an active state if an upstream packet is received at an eUSB2 port of the eUSB2 peripheral repeater within a first time period of receiving the downstream packet at the USB2 port;
   transmitting the upstream packet by the USB transmitter of the eUSB2 peripheral repeater during the active state;
   transitioning the USB transmitter of the eUSB2 peripheral repeater from the active state to the standby state after transmission of the upstream packet; and
   transitioning the USB transmitter of the eUSB2 peripheral repeater from the standby state to the idle state if more upstream packets are not received at the eUSB2 port of the eUSB2 peripheral repeater within a second time period.

2. The method of claim 1, further comprising transitioning the USB transmitter of the eUSB2 peripheral repeater from the idle state to the standby state within a third time period of receiving the downstream packet at the USB2 port.

3. The method of claim 1, wherein the first time period is 192 high speed (HS) unit intervals.

4. The method of claim 1, wherein the second time period is 280 high speed (HS) unit intervals (UIs).

5. The method of claim 1, wherein the downstream packet is generated by a host device.

6. The method of claim 1, wherein the upstream packet is generated by a peripheral device responsive to receiving the downstream packet from a host device.

7. The method of claim 1, further comprising:
   converting, by the eUSB2 peripheral repeater, an eUSB2 signal to a USB2 signal; and
   transmitting the USB2 signal through the USB2 port over a USB2 bus.

8. The method of claim 1, further comprising:
   converting, by the eUSB2 peripheral repeater, a USB2 signal to an eUSB2 signal; and
   transmitting the eUSB2 signal through the eUSB2 port over an eUSB2 bus.

9. The method of claim 1, further comprising receiving the downstream packet over a USB2 bus at the USB2 port of the eUSB2 peripheral repeater.

10. The method of claim 1, further comprising transmitting the upstream packet by the USB transmitter over a USB2 bus.

11. The method of claim 1, wherein the eUSB2 peripheral repeater is connected to a USB2 bus through the USB2 port.

12. The method of claim 1, wherein the eUSB2 peripheral repeater is connected to an eUSB2 bus through the eUSB2 port.

13. The method of claim 1, wherein during the active state current is driven to a load by the USB transmitter.

14. The method of claim 1, wherein during the standby state current is shunted to ground by the USB transmitter.

15. The method of claim 2, wherein the third time period is 128 ns.

16. A method of operating an embedded USB2 (eUSB2) peripheral repeater, comprising:
receiving a downstream packet at a USB2 port of the eUSB2 peripheral repeater;
transitioning a USB transmitter of the eUSB2 peripheral repeater from an idle state to a standby state responsive to receiving the downstream packet at the USB2 port; and
transitioning the USB transmitter of the eUSB2 repeater from the standby state to the idle state if an upstream packet is not received at an eUSB2 port of the eUSB2 repeater within a second time period responsive to receiving the downstream packet at the USB port.

17. The method of claim 16, further comprising transitioning the USB transmitter of the eUSB2 peripheral repeater from the idle state to the standby state within a third time period of receiving the downstream packet at the USB2 port.

18. The method of claim 16, wherein the second time period is 280 high speed (HS) unit intervals (UIs).

19. The method of claim 16, wherein the third time period is 128 ns.

20. The method of claim 16, wherein the downstream packet is generated by a host device.

21. The method of claim 16, wherein the upstream packet is generated by a peripheral device responsive to receiving the downstream packet from a host device.

22. The method of claim 16, further comprising receiving the downstream packet over a USB2 bus at the USB2 port.

23. The method of claim 16, further comprising transmitting the upstream packet by the USB transmitter over a USB2 bus.

24. The method of claim 16, wherein the eUSB2 peripheral repeater is connected to a USB2 bus through the USB2 port.

25. The method of claim 16, wherein the eUSB2 peripheral repeater is connected to an eUSB2 bus through the eUSB2 port.

26. A method of operating an embedded USB2 (eUSB2) peripheral repeater, comprising:
receiving a downstream packet at a USB2 port of the eUSB2 peripheral repeater, wherein the downstream packet is received over a USB2 bus, and wherein the eUSB2 peripheral repeater is connected to the USB2 bus through the USB2 port;
transitioning a USB transmitter of the eUSB2 peripheral repeater from an idle state to a standby state responsive to receiving the downstream packet at the USB2 port;
transitioning the USB transmitter of the eUSB2 peripheral repeater from the standby state to an active state if an upstream packet is received at an eUSB2 port of the eUSB2 peripheral repeater within a first time period of receiving the downstream packet at the USB2 port, wherein the upstream packet is received over an eUSB2 bus, and wherein the eUSB2 peripheral repeater is connected to the eUSB2 bus through the eUSB2 port;
transmitting the upstream packet over the USB2 bus by the USB transmitter of the eUSB2 peripheral repeater during the active state;
transitioning the USB transmitter of the eUSB2 peripheral repeater from the active state to the standby state after transmission of the upstream packet; and
transitioning the USB transmitter of the eUSB2 peripheral repeater from the standby state to the idle state if more upstream packets are not received at the eUSB2 port of the eUSB2 peripheral repeater within a second time period.

27. The method of claim 26, further comprising transitioning the USB transmitter of the eUSB2 peripheral repeater from the idle state to the standby state within a third time period of receiving the downstream packet at the USB2 port.

28. The method of claim 26, wherein the first time period is 192 high speed (HS) unit intervals (UIs).

29. The method of claim 26, wherein the second time period is 280 high speed (HS) unit intervals (UIs).

30. The method of claim 26, wherein the third time period is 128 ns.

31. The method of claim 26, wherein the downstream packet is generated by a host device.

32. The method of claim 26, wherein the upstream packet is generated by a peripheral device responsive to receiving the downstream packet from a host device.

* * * * *